United States Patent [19]

Zollman et al.

[11] Patent Number: 4,666,300
[45] Date of Patent: May 19, 1987

[54] POSITION MEASURING METHOD AND APPARATUS

[75] Inventors: Peter M. Zollman; John E. Kernthaler, both of Walton-on-Thames, England

[73] Assignee: Zed Instruments, Ltd., Surrey, England

[21] Appl. No.: 666,959

[22] PCT Filed: Feb. 14, 1984

[86] PCT No.: PCT/GB84/00039
§ 371 Date: Oct. 12, 1984
§ 102(e) Date: Oct. 12, 1984

[87] PCT Pub. No.: WO84/03121
PCT Pub. Date: Aug. 16, 1984

[30] Foreign Application Priority Data
Feb. 14, 1983 [GB] United Kingdom ............ 8304024

[51] Int. Cl.⁴ .................. G01B 11/26; G01C 1/00; E21B 47/022
[52] U.S. Cl. .................... 356/141; 33/304; 33/313; 356/1
[58] Field of Search ............. 367/19; 33/304, 313; 356/1, 152, 141

[56] References Cited
U.S. PATENT DOCUMENTS

| 3,494,699 | 2/1970 | Globe | 356/152 |
| 3,751,169 | 8/1973 | Fornerod | 356/152 |
| 4,068,208 | 1/1978 | Rice et al. | 367/19 |
| 4,231,111 | 10/1980 | Neeley | 367/19 |

FOREIGN PATENT DOCUMENTS
2101742 1/1983 United Kingdom .

Primary Examiner—Stephen C. Buczinski
Attorney, Agent, or Firm—Handal & Morofsky

[57] ABSTRACT

A method of, and apparatus for, determining the position of an unknown fixed location, e.g. the end of an underground passage inaccessible to human beings, involves establishing a chain of measuring station of known station spacing between a base and a position at the unknown fixed location. Each station (except, optionally, the foremost one) of the chain is provided with light sources and photodetectors as well as a goniometer for measuring in at least one plane the angle of inclination of the station immediately ahead of it. The stations of the chain are spaced apart by a known distance and arranged so that each station is within the operative range of the immediately preceding station. By transmitting the measurement results from each station to the base, and processing the data, the position of the fixed location from the measurement results.

10 Claims, 6 Drawing Figures

POSITION MEASURING METHOD AND APPARATUS

This invention concerns position measuring method and apparatus, particularly, but not exclusively, for determining the position of the end of an underground passage, such as the end of a tunnel, especially one which is too small or too dangerous for human access.

One conventional method of surveying constructions such as a tunnel involves measuring distance to a fixed point within the tunnel and the angle that point makes with respect to a known baseline. If the tunnel is curved, the location of the end of the tunnel may have to be determined by establishing a series of intermediate sites, each visible from its nearest neighbour and each surveyed from its neighbour. However, if the tunnel is of very small diameter, and/or has a dangerous environment, e.g. biotoxic, human access is excluded and this method is not feasible.

In remotely piloted boring of narrow tunnels or pipes it is important to establish accurately the location of the end of the tunnel. In general, free access to the tunnel is not available and the presence of inhomogeneities or obstructions in the ground render wave propagation source and detector systems unreliable.

Our own GB-PS No. 1,513,380 describes an invention which can be miniaturised and utilised as a tunnel guidance system for earth-working, tunnel-boring etc. machinery, and which can be used to determine the position of a target, provided that the target and a laser beam directed towards the target are in a straight line. Remotely controllable and monitorable television scanning/monitoring systems utilising beams and targets are also known but they are not only complicated and expensive but are also unable to operate along curved paths.

According to one aspect of the invention there is provided apparatus for determining the position of an unknown fixed location e.g. the end of an underground passage inaccessible to human beings, comprising a plurality of measuring stations disposed at a known distance from each other along a path towards said locations, said stations being linked together so as to form a communication chain disposed along said path, means at each station (except optionally, the first one) for measuring the angle of inclination in at least one plane of the station immediately ahead of it, means for transmitting the measurement results to the first station or other accessibly located base station and means for calculating the position of said fixed location from said measurement results.

Preferably the measuring means comprises an optical goniometer; advantageously, each station may incorporate at least one illuminated area directed towards the succeeding station and at least one photodetector directed towards the preceding station. However, other transducers and data transceivers may also be used.

Preferably, the goniometer is effective to measure angles of inclination with means for maintaining its orientation relative to a reference plane or axis.

The goniometer may include optical element(s) effective to produce a band or line image of the light source on the photodetector(s)—which may be arrays of photodetecting elements—to render the measurement insensitive to the position of said source in a given plane.

The term 'light' is used broadly as including not only visible light but also infrared and ultraviolet light; the actual wavelength of the radiation is not material, provided of course that the detector is responsive or sensitive to that wavelength.

Means may be provided for selectively and sequentially energising and de-energising the light sources and/or the detectors of the chain so as to avoid the possibility of a given detector receiving light from than one upstream station.

In a preferred embodiment, a servo-system incorporating a level sensor is provided to maintain the detector horizontal.

Each station preferably transmits raw data, via cables, to a base station for processing, and storing displaying, recording etc.

The stations may each process the measurement results (hereafter: data) but preferably the data is transmitted in a 'raw' or unprocessed or semi-processed condition to a base.

Preferably, each station performs the measurement repeatedly so as to provide a redundancy of data at said base, whereby as the chain progresses, the said fixed location can be established so long as the first station in the chain remains operative.

In an expedient embodiment, the processed data is used to control or steer a tunnelling or earth-working machine; this machine may carry the station chain into the passage with the foremost or first station being attached to it.

According to another aspect of this invention there is provided a method of determining the position of an unknown fixed location, e.g. the end of an underground passage inaccessible to human beings, comprising establishing a chain of measuring stations of known station spacing between a base and a position at or adjacent to said unknown fixed location, each station (except, optionally, the foremost one) of said chain being provided with measuring means for measuring in at least one plane the angle of inclination of the station immediately ahead of it, the stations of said chain being spaced apart by a known distance and arranged so that each station is within the operative range of the said measuring means of the immediately preceding station, and transmitting the measurement results from each said station to said base (or other accessible location) for calculating and optionally also recording and/or displaying, the position of the fixed location.

Preferably, for surveying an underground passage the stations are introduced into and advanced along the underground passage successively to the end thereof; and advantageously the sequencing of the measurements and the transmission of the results from each said station is automatically controlled. In a preferred embodiment the measurement of the angle of inclination is performed electrooptically, each station being capable of emitting electromagnetic radiation towards the station behind it and of detecting electromagnetic radiation from the station ahead of it.

Preferred embodiments of the invention will now be described, purely by way of example, with reference to the accompanying schematic drawings, wherein.

Figure 1:
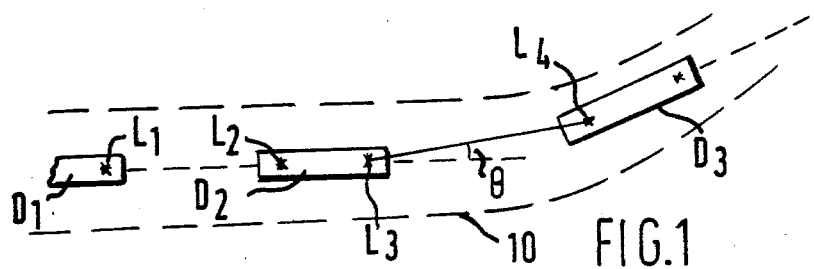
FIG. 1 illustrates the disposition of three measuring stations along a curved underground passage, for elucidating the method and apparatus according to the invention.

Referring to FIG. 1, there is an arrangement of measuring stations $D_1$, $D_2$ and $D_3$ located along a curved tunnel 10. Each station D has two illuminated areas L; FIG. 1 shows area $L_1$ only of station $D_1$; areas $L_2$, $L_3$ of station $D_2$ and area $L_4$ only of the first or foremost station $D_3$—which need not have a second area L, although in practice does. The stations D are separated from each other by a known distance.

If as a result of an earlier survey (or previous operation of the process to be described) the locations of stations $D_1$ and $D_2$ are known, then by using an optical goniometer at station $D_2$, measuring the angle $\theta$ determines the location of station $D_3$. The surveying process is then continued, using stations $D_2$ and $D_3$ as reference, and this may be continued until the tunnel end face (not shown) is reached.

As a result of mechanical requirements, the illuminated areas L, the goniometer centres and the centre of the measuring station may not be coincident; this may readily be allowed for in the necessary calculation.

This method of surveying assumes that the stations D, also referred to as detectors, shown above are essentially co-planar, and no information is deduced about the gradient of the tunnel. This information may be provided by a separate device, e.g. a pair of liquid reservoirs, one at each end of the tunnel connected for communication by a tube from which the vertical displacement between the ends can be deduced.

A function of the measuring station D is to measure the angle $\theta$ shown in FIG. 1. A method for performing this measurement automatically is now described.

Figure 2A:
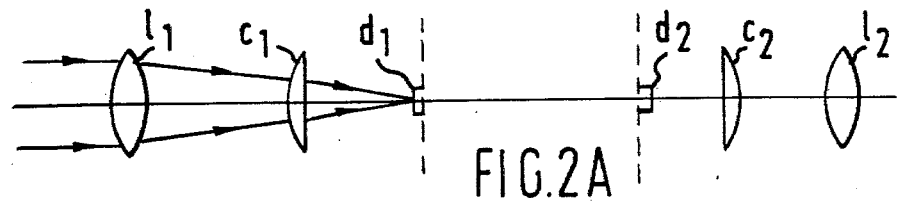
FIGS. 2A and 2B are, respectively, vertical and horizontal cross-sections of the optical arrangement at a given measuring station.
Figure 2B:

The optical arrangement shown in FIGS. 2A and 2B consists of two similar sections consisting of components converging lenses $l_1$, $l_2$; cylindrical lenses $c_1$, $c_2$; and photodetectors $d_1$, $d_2$. The latter are preferably each arrays of photodetector elements which may be separate devices or one or more devices containing a plurality of individual photodetectors. The focal length of the lenses $l_1$, $l_2$ is chosen to match the length of the detector array to the desired total angle measuring range. Lenses $c_1$, $c_2$ are effective to produce a band or line image of a source of light on the detectors $d_1$, $d_2$ and hence make the measurement insensitive to the vertical position of the source. Lenses $c_1$, $c_2$ may be elements separate from lenses $l_1$, $l_2$ or may be incorporated with them into cylindrospherical lenses.

Since the detector arrays consist of discrete elements, the resolution of the goniometer is apparently limited by the finite element spacing. However, there exist methods of interpolation as described e.g. in our GB-PS No. 1,513,380 which enable the 'image' position on the array to be determined to within a fraction of an element spacing.

Furthermore, there are available extended photodetectors which give an output proportional to the position of an illuminated area on the detector which might also be employed in this application.

Figure 2C:
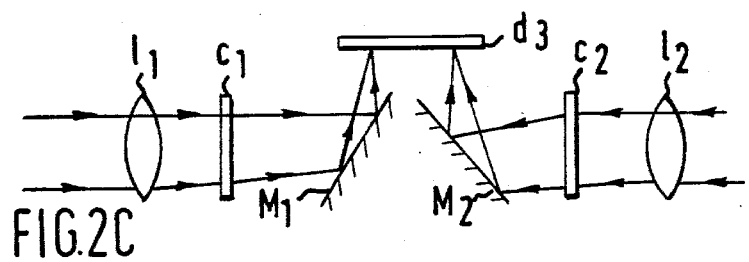
FIG. 2C is a vertical section illustrating an alternative optical arrangement.

An alternative, though less preferred, arrangement of the optical elements is shown in FIG. 2C. It includes two reflecting surfaces $M_1$, $M_2$ which deflect the optical path to a single detector $d_3$. The angle between reflectors $M_1$ and $M_2$ is different from 90° so that the two images areas do not overlap.

As has been described, to facilitate the use of an optical goniometer each measuring station D incorporates one or more brightly illuminated areas L which emit radiation the spectrum of which includes those wavelengths to which the detector d is sensitive. Possible sources include solid state light-emitting (including infrared-emitting) diodes or laser diodes or the filament of a tungsten lamp, or a surface illuminated by one of these, and possibly delineated by a substantially non-emitting boundary. The source may incorporate a lens to intensify the radiation directed towards the detector d.

Figure 3:
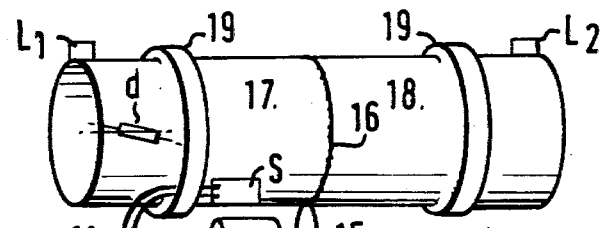
FIG. 3 is a perspective view of a measuring station with associated means for maintaining its orientation in a predetermined attitude.

The detector unit described above measures angles in one plane only, being provided with two parallel detectors. To provide useful surveying information, means shown in FIG. 3 are provided for rotating the detector unit so that the plane of the detectors remains essentially horizontal.

In the arrangement shown above in FIG. 3, S is a device providing an indication of the extent to which the detector axis deviates from the horizontal. A suitable device is one manufactured by e.g. the Monolith Electronics Company and consists essentially of an electrically conducting fluid sealed in a container that has a number of electrical contact pins. Using a suitable energizing signal, a measure of the 'out of horizontal' tilt may be obtained. This signal is fed via a flexible cable 11 to a control unit 12 where it is processed. The output of the control unit 12 is fed via a cable 13 to a motor 14 connected to drive a wheel 15. The wheel 15 may be a friction roller or a toothed gear wheel meshing with teeth 16 disposed on the casing 17 of the housing 18 of the detector unit. The housing 18 is supported in rotation by bearings 19. One detector element d is shown schematically, and by virtue of the rotation it is restored to the horizontal.

Other 'out of horizontal' detectors may be used. The motor 14 may be inside or outside the detector casing 17. The motor 14 may be powered by means other than electricity.

As the measuring system contains a large number of similar units disposed in generally inaccessible locations it is desirable to minimise the amount of signal processing done in each of the measuring stations D. To this end, means are provided for transmitting raw data from each measuring station D to one or more base stations, to be described in greater detail below, but which may employ complex circuity, e.g. containing stored program control units (computers or microprocessors). The base station(s) may be situated at sites remote from the tunnelling operation. In addition, the or a base station may control the sequencing of the selective energising of the illuminators (lamps) L and detectors d. Selectively energisation of the lamps L in the measuring chain is desirable to ensure that no confusion is caused by a detector array d being illuminated by more than one lamp L.

Figure 4:
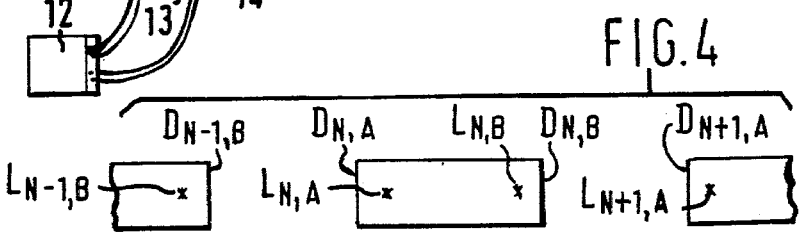
FIG. 4 illustrates three measuring stations serving to explain their sequence of energisation.

FIG. 4 shows part of a measuring system including three measuring stations $N-1$, $N$, $N+1$ with their associated lamps . . . $L_{N-1,B}$, $L_{N,A}$, $L_{N,B}$, $L_{N+1,A}$ . . . and detectors . . . $D_{N-1,B}$, $D_{N,B}$, $D_{N+1,A}$. The energisation timing sequence tabulated below may be employed:

| Lamp On | Detector On |
| --- | --- |
| $L_{N,A}$ | $D_{N-1,B}$ |

-continued

| Lamp On | Detector On |
|---|---|
| $L_{N-1,B}$ | $D_{N,A}$ |
| $L_{N+1,A}$ | $D_{N,B}$ |
| $L_{N,B}$ | $D_{N+1,A}$ |
| . | . |
| . | . |
| . etc. | . |
| . | . |

A base station (not shown) contains means for signalling to and receiving data from the measuring stations or other base stations, if present. In addition, the base station must be able to compute from the data supplied by the measuring stations the location of the tunnel face.

If the measurements are being performed on a tunnel as it is being excavated, and the measuring stations are inserted into the tunnel in sequence, then parts of the tunnel will be repeatedly measured by different stations as they progress down the tunnel. Furthermore, by using a multiplicity of detectors a measurement of the entire tunnel is obtained. Hence if at some later stage of the excavation a measuring station becomes inoperative, then the integrity of the measurement process is not lost, as the location of the failed station can be deduced from earlier measurements, and the survey continued beyond that point by using as a new baseline detector positions lying in an already surveyed part of the tunnel.

The information on the location and direction of the tunnel face may be displayed in a variety of ways such as light-emitting diode displays, liquid crystal displays, cathode-ray tubes or other suitable means and/or printed out as a permanent record. In addition the information may be made available for the automatic control of the tunnelling machine.

What is claimed is:

1. Apparatus for determining the position of an unknown fixed underground location, which may be inaccessible to human beings, comprising a plurality of measuring stations disposed at a known distance from each other along a path towards said location, each station incorporating means for providing at least one illuminated area directed towards the next succeeding station and with at least one photodetector directed towards the immediately preceding station, said stations being linked together so as to form a communication chain disposed along said path, means at each station (except, optionally, the first one) for measuring the angle of inclination in at least one plane of the station immediately ahead of it, means for transmitting the measurement results to the first station or other accessibly located base station and means for calculating the position of said fixed location from said measurement results.

2. Apparatus according to claim 1, wherein the measuring means comprises an optical goniometer.

3. Apparatus according to claim 1, wherein the measuring means comprises an optical goniometer which includes optical element(s) effective to produce a band-like narrow image of a light source on the photodetector(s) to render the measurement insensitive to the position of said source in a given plane.

4. Apparatus according to claim 1, wherein means are provided for selectively and sequentially energising and de-energising the light sources and/or the photodetectors of the chain so as to avoid the possibility of a given photodetector receiving light from more than one upstream station.

5. Apparatus according to claim 1, wherein a servo-system incorporating a level sensor is provided to maintain each photodetector horizontal.

6. Apparatus according to claim 1, wherein the measuring means at each station is effective to perform the measurement repeatedly so as to provide a redundancy of data at said first station or other accessibly located base station, whereby as the chain progresses, the said fixed location can be established so long as the first station in the chain remains operative.

7. A method of determining the position of an unknown fixed underground location which may be inaccessible to human beings, comprising establishing a chain of measuring stations of known station spacing between a base and a position at or adjacent to said unknown fixed location, providing each station with at least one illuminated area directed towards the next succeeding station and with at least one photodetector directed towards the immediately preceding station, each station (except, optionally, the foremost one) of said chain being provided with measuring means for measuring in at least one plane the angle of inclination of the station immediately ahead of it, the stations of said chain being spaced apart by a known distance and arranged so that each station is within the operative range of the said measuring means of the immediately preceding station, and transmitting the measurement results from each said station to said base (or other accessible location) for calculating and optionally also recording and/or displaying, the position of the fixed location.

8. A method according to claim 7, wherein for surveying an underground passage, the stations are introduced into and advanced along the underground passage successively to the end thereof; and the sequencing of the measurements and the transmission of the results from each said station is automatically controlled.

9. A method according to claim 7, wherein the measurement of the angle of inclination is performed electro-optically, each station being capable of emitting electromagnetic radiation towards the station behind it and of detecting electromagnetic radiation from the station ahead of it.

10. A method according to claim 7 wherein each station forms the measurement repeatedly so as to provide a redundancy of data at said base (or other accessible location), whereby as the chain progresses, the said fixed location can be established so long as the first station in the chain remains operative.

* * * * *